United States Patent
Jung et al.

(10) Patent No.: US 7,408,614 B2
(45) Date of Patent: Aug. 5, 2008

(54) LIQUID CRYSTAL DISPLAY PANEL HAVING SEAL PATTERN FOR EASY CUT LINE SEPARATION MINIMIZING LIQUID CRYSTAL CONTAMINATION AND METHOD OF MANUFACTURING THE SAME

(75) Inventors: Sung-Su Jung, Daegu (KR); Yong-Keun Kwak, Gangwon-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/824,436

(22) Filed: Apr. 15, 2004

(65) Prior Publication Data

US 2005/0128418 A1    Jun. 16, 2005

(30) Foreign Application Priority Data

Dec. 10, 2003  (KR) .................. 10-2003-0089855

(51) Int. Cl.
    *G02F 1/1339*     (2006.01)
(52) U.S. Cl. ........................ 349/190; 349/153
(58) Field of Classification Search .......... 349/153
    See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,640,583 A * | 2/1987 | Hoshikawa et al. | 349/153 |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |

(Continued)

FOREIGN PATENT DOCUMENTS

CN    1447164    10/2003

(Continued)

*Primary Examiner*—David Nelms
*Assistant Examiner*—Timothy L. Rude
(74) *Attorney, Agent, or Firm*—McKenna, Long & Aldridge LLP

(57) ABSTRACT

A seal pattern structure for a liquid crystal display panel is disclosed. Because an overlap portion of the seal pattern that encompasses in a closed form the outer edge of the image display part is minimized, excessive distribution of sealant at the seal pattern overlap portion may be prevented. The liquid crystal display panel including the seal pattern includes a substrate having at least one image display part; a start pattern formed from a point spaced apart from the image display part to a point adjacent to an outer edge of the image display part; a main pattern connected to the start pattern and encompassing the outer edge of the image display part; and an end pattern connected to the main pattern and formed from the outer edge of the image display part to a point spaced apart from the image display part, wherein a connection part between the start pattern and the main pattern and a connection part between the main pattern and the end pattern cross each other. A method of forming a seal pattern on a substrate for a liquid crystal display panel is also disclosed.

21 Claims, 5 Drawing Sheets

U.S. PATENT DOCUMENTS

| | | | |
|---|---|---|---|
| 5,499,128 | A | 3/1996 | Hasegawa et al. |
| 5,507,323 | A | 4/1996 | Abe |
| 5,511,591 | A | 4/1996 | Abe |
| 5,539,545 | A | 7/1996 | Shimizu et al. |
| 5,548,429 | A | 8/1996 | Tsujita |
| 5,642,214 | A | 6/1997 | Ishii et al. |
| 5,680,189 | A | 10/1997 | Shimizu et al. |
| 5,742,370 | A | 4/1998 | Kim et al. |
| 5,757,451 | A | 5/1998 | Miyazaki et al. |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine et al. |
| 5,893,625 | A * | 4/1999 | Tamatani et al. ............ 349/189 |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 6,707,250 | B2 * | 3/2004 | Okano et al. ................ 313/582 |
| 2001/0021000 | A1 | 9/2001 | Egami |
| 2003/0025867 | A1 | 2/2003 | Yoshizoe |
| 2003/0081155 | A1 | 5/2003 | Moon et al. |
| 2003/0179340 | A1 | 9/2003 | Park et al. |
| 2003/0223030 | A1 | 12/2003 | Byun et al. |

FOREIGN PATENT DOCUMENTS

| | | |
|---|---|---|
| EP | 1 003 066 A1 | 5/2000 |
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | 62-054225 | 3/1987 |
| JP | 62-054228 | 3/1987 |
| JP | 62-054229 | 3/1987 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | 03-009549 | 1/1991 |
| JP | 05-036425 | 2/1993 |
| JP | 05-036426 | 2/1993 |
| JP | 05-107533 | 4/1993 |
| JP | 05-127179 A1 | 5/1993 |
| JP | 05-154923- | 6/1993 |
| JP | 05-265011 A1 | 10/1993 |
| JP | 05-281557 A1 | 10/1993 |
| JP | 05-281562 A1 | 10/1993 |
| JP | 06-018829 | 1/1994 |
| JP | 06-051256 A1 | 2/1994 |
| JP | 06-064229 | 3/1994 |
| JP | 06-148657 A1 | 5/1994 |
| JP | 06-160871 | 6/1994 |
| JP | 06-194637 | 7/1994 |
| JP | 06-235925 | 8/1994 |
| JP | 06-265915 A1 | 9/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | 07-275770 | 10/1995 |
| JP | 07-275771 | 10/1995 |
| JP | 08-076133 | 3/1996 |
| JP | 08-095066 A1 | 4/1996 |
| JP | 08-101395 | 4/1996 |
| JP | 08-106101 A1 | 4/1996 |
| JP | 08-110504 | 4/1996 |
| JP | 08-136937 | 5/1996 |
| JP | 08-171094 A1 | 7/1996 |
| JP | 08-173874 | 7/1996 |
| JP | 08-190099 A1 | 7/1996 |
| JP | 08-240807 A1 | 9/1996 |
| JP | 09-001026 | 1/1997 |
| JP | 09-005762 A1 | 1/1997 |
| JP | 09-026578 A1 | 1/1997 |
| JP | 09-061829 | 3/1997 |
| JP | 09-073075 A1 | 3/1997 |
| JP | 09-073096 A1 | 3/1997 |
| JP | 09-094500 | 4/1997 |
| JP | 09-127528 A1 | 5/1997 |
| JP | 09-230357 A1 | 9/1997 |
| JP | 09-281511 A1 | 10/1997 |
| JP | 09-311340 A1 | 12/1997 |
| JP | 10-123537 A1 | 5/1998 |
| JP | 10-123538 A1 | 5/1998 |
| JP | 10-142616 A1 | 5/1998 |
| JP | 10-174924 | 6/1998 |
| JP | 10-177178 | 6/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 A1 | 1/1999 |
| JP | 11-038424 A1 | 2/1999 |
| JP | 11-064811 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | 11-262712 | 9/1999 |
| JP | 11-264991 | 9/1999 |
| JP | 11-326922 | 11/1999 |
| JP | 11-344714 A1 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |

| | | | | | | |
|---|---|---|---|---|---|---|
| JP | 2001-033793 | 2/2001 | | JP | 2002-090760 A1 | 3/2002 |
| JP | 2001-042341 | 2/2001 | | JP | 2002-107740 A1 | 4/2002 |
| JP | 2001-051284 | 2/2001 | | JP | 2002-122870 | 4/2002 |
| JP | 2001-066615 | 3/2001 | | JP | 2002-122872 A1 | 4/2002 |
| JP | 2001-091727 | 4/2001 | | JP | 2002-122873 A1 | 4/2002 |
| JP | 2001-117105 | 4/2001 | | JP | 2002098979 | 4/2002 |
| JP | 2001-117109 | 4/2001 | | JP | 2002-131762 | 5/2002 |
| JP | 2001-133745 | 5/2001 | | JP | 2002-139734 | 5/2002 |
| JP | 2001-133794 | 5/2001 | | JP | 2002-156518 | 5/2002 |
| JP | 2001-133799 | 5/2001 | | JP | 2002-169166 | 6/2002 |
| JP | 2001-142074 | 5/2001 | | JP | 2002-169167 | 6/2002 |
| JP | 2001-147437 | 5/2001 | | JP | 2002-182222 | 6/2002 |
| JP | 2001-154211 | 6/2001 | | JP | 2002-202512 A1 | 7/2002 |
| JP | 2001-166272 | 6/2001 | | JP | 2002-202514 A1 | 7/2002 |
| JP | 2001-166310 | 6/2001 | | JP | 2002-214626 A1 | 7/2002 |
| JP | 2001-183683 | 7/2001 | | JP | 2002-229042 | 8/2002 |
| JP | 2001-209052 | 8/2001 | | JP | 2002-236276 | 8/2002 |
| JP | 2001-209056 | 8/2001 | | JP | 2002-258299 | 8/2002 |
| JP | 2001-209057 | 8/2001 | | JP | 2002-236292 | 9/2002 |
| JP | 2001-209058 | 8/2001 | | JP | 2002-277865 | 9/2002 |
| JP | 2001-209080 | 8/2001 | | JP | 2002-277866 | 9/2002 |
| JP | 2001-222017 | 8/2001 | | JP | 2002-277881 | 9/2002 |
| JP | 2001-235758 | 8/2001 | | JP | 2002-287156 | 10/2002 |
| JP | 2001-215459 | 9/2001 | | JP | 2002-296605 | 10/2002 |
| JP | 2001-255542 | 9/2001 | | JP | 2002-311438 | 10/2002 |
| JP | 2001-264782 | 9/2001 | | JP | 2002-311440 | 10/2002 |
| JP | 2001-201750 | 10/2001 | | JP | 2002-311442 | 10/2002 |
| JP | 2001-272640 | 10/2001 | | JP | 2002-323687 | 11/2002 |
| JP | 2001-281675 | 10/2001 | | JP | 2002-323694 | 11/2002 |
| JP | 2001-281678 | 10/2001 | | JP | 2002-333628 | 11/2002 |
| JP | 2001-282126 | 10/2001 | | JP | 2002-333635 | 11/2002 |
| JP | 2001-305563 | 10/2001 | | JP | 2002-333843 | 11/2002 |
| JP | 2001-330837 | 11/2001 | | JP | 2002-341329 | 11/2002 |
| JP | 2001-330840 A1 | 11/2001 | | JP | 2002-341355 | 11/2002 |
| JP | 2001-356353 | 12/2001 | | JP | 2002-341356 | 11/2002 |
| JP | 2001-356354 A1 | 12/2001 | | JP | 2002-341357 | 11/2002 |
| JP | 2002-014360 A1 | 1/2002 | | JP | 2002-341358 | 11/2002 |
| JP | 2002-023176 A1 | 1/2002 | | JP | 2002-341359 | 11/2002 |
| JP | 2002-049045 A1 | 2/2002 | | JP | 2002-341362 | 11/2002 |
| JP | 2002-079160 | 3/2002 | | JP | 2003344863 | 3/2003 |
| JP | 2002-080321 | 3/2002 | | KR | 2000-0035302 A1 | 6/2000 |
| JP | 2002-082340 A1 | 3/2002 | | | | |
| JP | 2002-090759 A1 | 3/2002 | | | | |

* cited by examiner

LIQUID CRYSTAL DISPLAY PANEL HAVING SEAL PATTERN FOR EASY CUT LINE SEPARATION MINIMIZING LIQUID CRYSTAL CONTAMINATION AND METHOD OF MANUFACTURING THE SAME

This application claims the benefit of Korean Patent Application No. 2003-89855, filed on Dec. 10, 2003, which is hereby incorporated by reference for all purposes as if fully set forth herein.

BACKGROUND OF THE INVENTION

1. Field of the Invention

The present invention relates to a seal pattern structure for a liquid crystal display panel and, more particularly, to a seal pattern structure for a liquid crystal display panel capable of minimizing an overlap portion of a seal pattern encompassing an outer edge of a image display part in a closed form.

2. Discussion of the Related Art

In general, a liquid crystal display is a display device where data signals that correspond to picture information are individually supplied to liquid crystal cells arranged in a matrix form. The light transmittance of each of the liquid crystal cells is controlled to display a desired picture.

The liquid crystal display device includes a liquid crystal display panel having pixels arranged in a matrix form and a gate driving unit and a data driving unit for driving the pixels.

The liquid crystal display panel also has a color filter substrate and a thin film transistor array substrate attached to each other, but maintaining a uniform cell gap there between, and a liquid crystal layer between the color filter substrate and the thin film transistor array substrate.

The liquid crystal display panel is formed by the color filter substrate and the thin film transistor array substrate being attached. A common electrode and a pixel electrode are formed to apply an electric field to the liquid crystal layer and may both be formed on the thin film transistor array substrate or the common electrode may be formed on the color filter substrate and the pixel electrode may be formed on the thin film transistor array substrate, depending on the type of LCD.

Namely, in a state that a voltage is applied to the common electrode, a voltage applied to the pixel electrode is controlled, thereby individually adjusting light transmittance of unit pixels. In order to control the voltage applied to the pixel electrode by unit pixels, a thin film transistor is used as a switching unit is formed at each unit pixel.

Alignment layers are formed at both facing surfaces of the thin film transistor array substrate and the color filter substrate. The alignment layers are rubbed or photoaligned to align the liquid crystal molecules of the liquid crystal layer in a certain direction.

FIG. 1 is a plan view of the unit liquid crystal display panel formed by a thin film transistor array substrate and a color filter substrate according to the related art.

As illustrated in FIG. 1, the liquid crystal display panel 100 includes an image display part 113 in which the liquid crystal cells are arranged in a matrix form, a gate pad part 114 connected to the gate lines of the image display part 113, and a data pad part 115 connected to the data lines. The gate pad part 114 and the data pad part 115 are formed along an edge region of the thin film transistor array substrate 101 that does not overlap with the color filter substrate 102, e.g., the portion of the thin film transistor array substrate 101 that extends beyond the edge of the color filter substrate 102. The gate pad part 114 supplies a scan signal from a gate driver integrated circuit (not shown) to the gate lines of the image display part 113, and the data pad part 115 supplies image information from a data driver integrated circuit (not shown) to the data lines of the image display part 113.

Data lines to which image information is applied and gate lines to which a scan signal is applied are provided on the thin film transistor array substrate 101. The data lines and the gate lines cross each other. Additionally, a thin film transistor for switching the liquid crystal cells is provided at each crossing of the data lines and the gate lines. A pixel electrode for driving the liquid crystal cells connected to the thin film transistor is provided on the thin film transistor array substrate 101, and a passivation film protecting the pixel electrode and the thin film transistor is formed on the entire surface of the thin film transistor array substrate 101.

Color filters (not shown) in the cell regions are separated by a black matrix (not shown). A common transparent electrode is provided on the color filter substrate 102. A cell gap is formed by a spacer between the thin film transistor array substrate 101 and the color filter substrate 102, which are attached to each other by a seal pattern 116 formed along an outer edge of the image display part 113.

In fabricating the liquid crystal display panel, a method for simultaneously forming a multiple liquid crystal display panels on a large-scale mother substrate is typically used. Thus, this method requires a process for separating the liquid crystal display panels from the large-scale mother substrate by cutting and processing the mother substrate having the plurality of liquid crystal display panels formed thereon.

After a liquid crystal display panel is separated from the large-scale mother substrate, liquid crystal is injected through a liquid crystal injection opening to form a liquid crystal layer in the cell gap that separates the thin film transistor array substrate 101 and the color filter substrate 102. Then, the liquid crystal injection opening is sealed.

To fabricate a liquid crystal display panel, the following processes are generally required. First, the thin film transistor array substrate 101 and the color filter substrate 102 are separately fabricated on the first and second mother substrates. The first and second mother substrates are attached in such a manner that a uniform cell gap is maintained therebetween. The attached first and second mother substrates are cut into unit panels. Then, the liquid crystal is injected to the cell gap between the thin film transistor array substrate 101 and the color filter substrate 102.

A process of forming the seal pattern 116 along an outer edge of the image display part 113 is required to attach the thin film transistor array substrate 101 and the color filter substrate 102. The related art seal pattern forming method will now be described.

FIGS. 2A and 2B illustrate a screen printing to form a seal pattern.

As shown in FIGS. 2A and 2B, there is provided a screen mask 206 patterned so that seal patterns forming regions for forming seal patterns 216A–216F are selectively exposed. A rubber squeegee 208 for selectively supplying a sealant 203 to the substrate 200 through the screen mask 206 is used to simultaneously form the plurality of seal patterns 216A–216F. Thus, the plurality of seal patterns 216A–216F are formed along each outer edge of image display part 213A–213F of the substrate 200, and liquid crystal injection openings 204A–204F are formed at one side. The openings are for injecting liquid crystal into a gap between the thin film transistor array substrate 101 and the color filter substrate 102. The seal patterns 216A–216F prevent leakage of the liquid crystal.

In general, the screen printing method includes applying the sealant 203 on the screen mask 206 having seal patterns forming regions patterned thereon; forming the seal patterns 216A–216F on the substrate 200 through printing with the rubber squeegee 208; drying the seal pattern 216 by evaporating a solvent contained in the seal patterns 216A–216F; and leveling it the seal pattern 216.

The screen printing method is widely used because it has the advantage of processing ease. However, it has the disadvantage of sealant waste. More particularly, sealant is wasted because sealant is applied to the entire surface of the screen mask 206 and then the seal patterns 216A–216F are simultaneously printed with the rubber squeegee 208 such that the excess sealant material, which is not printed, is thrown away.

In addition, the screen printing method has another disadvantage in that a rubbed alignment layer (not shown) formed on the substrate 200 is degraded as a result of the screen mask 206 being brought into contact with the substrate 200. The degradation of the rubbed alignment layer degrades picture quality of the liquid crystal display device.

Therefore, to overcome the shortcomings of the screen printing method, a seal dispensing method has been proposed.

FIG. 3 is an exemplary view of a dispensing method for forming a seal pattern in accordance with the related art.

As illustrated in FIG. 3, while a table 310 with the substrate 300 loaded thereon is being moved in forward/backward and left/right directions, a plurality of seal patterns 316A–316F are formed along each outer edge of image display parts 313A–313F formed on a substrate 300 by applying a certain pressure to the plurality of syringes 301A–301C filled with sealant. In this case, the seal patterns 316A–316F are sequentially formed by the unit of line of the image display parts 313A–313F, and one side of each seal pattern is opened to form liquid crystal injection openings 304A–304F.

In this seal dispensing method, because the sealant is selectively supplied to the region where the seal patterns 316A–316F are to be formed, sealant consumption can be reduced. In addition, since the syringes 301A–301C do not contact the alignment layer (not shown) of the image display parts 313A–313F of the substrate 300, the rubbed alignment layer cannot be damaged, and thus the picture quality of the liquid crystal display device is not degraded.

One respective side of each of the seal patterns 216A–216F and 316A–316F formed by the screen printing method or the seal dispensing method are opened to function as liquid crystal injection openings 204A–204F and 304A–304F. The seal patterns can be varied in their forms according to methods for forming a liquid crystal layer on the liquid crystal display panel, that is, for example, according to a vacuum injection method and a dropping or dispensing method.

First, the vacuum injection method is performed using a liquid crystal injection opening of a unit liquid crystal display panel that has been separated from a large-scale mother substrate, which is put in a container filled with a liquid crystal in a chamber in which a certain vacuum is set. Then, liquid crystal is injected into the liquid crystal display panel according to a pressure difference between interior and exterior of the liquid crystal display panel by varying the degree of vacuum in the chamber. After the liquid crystal is filled in the liquid crystal display panel, the liquid crystal injection opening is sealed to form the liquid crystal layer of the liquid crystal display panel.

Thus, when the liquid crystal layer is formed on the liquid crystal display panel through the vacuum injection method, as illustrated in FIGS. 2A and 3, the seal patterns 216A–216F and 316A–316F are opened at one side to form the liquid crystal injection openings 204A–204F and 304A–304F.

However, the vacuum injection method as described above has the following problems.

First, it takes a long time to fill the liquid crystal into the liquid crystal display panel. In general, the attached liquid crystal display panel with an area of several hundreds $cm^2$ has a gap of a few μms (micrometers). Thus, even with the vacuum injection method, which uses pressure difference, the injection of liquid crystal takes a long time. For instance, in the case of fabricating a liquid crystal display panel of about 15 inches, it takes 8 hours to fill the liquid crystal display panel with liquid crystal. Thus, because such a long time is taken during the fabrication of the liquid crystal display panel, the productivity is degraded. In addition, as the liquid crystal display panel increases in size, the time required for filling liquid crystal correspondingly increases, and thus liquid crystal filling defects further occur. Therefore, the vacuum injection method can hardly cope with the large-scale liquid crystal display panel.

Another problem with the vacuum injection method is that too much liquid crystal is consumed. In general, the actually injected quantity of liquid crystal in the vacuum injection method is very small compared to the quantity of liquid crystal in the container. When liquid crystal is exposed to the air or to a specific gas, it reacts with the gas and degrades. Thus, even if liquid crystal in a container is filled into a plurality of liquid crystal display panels. A large quantity of liquid crystal remaining after the filling has to be discarded, which increases the overall unit price of the liquid crystal display and thus decreases price competitiveness.

In order to overcome such problems of the vacuum injection method, a dropping method is proposed.

In the dropping or dispensing method, liquid crystal is dropped or dispensed on a plurality of thin film transistor array substrates fabricated from a first large-scale mother substrate or on color filter substrates fabricated from a second large-scale mother substrate. The first and second mother substrates are then attached to each other so that liquid crystal is uniformly distributed over the entire image display regions by the attaching pressure, thereby forming a liquid crystal layer.

In the dropping method, liquid crystal may be dropped within a short time compared to the vacuum injection method. Even though the liquid crystal display panel is large in size, the liquid crystal layer may be quickly formed.

In addition, because only the amount of liquid crystal that is required, is dropped the high unit price of the liquid crystal display panel formed by the vacuum injection method caused by the expensive liquid crystal being discarded is prevented such that price competitiveness is improved.

When the liquid crystal layer is formed on the liquid crystal display panel through the dropping method, the seal patterns 416A–416F encompassing each outer edge of the image display parts 413A–413F formed on the substrate 400 have the closed patterns with start points and end points met each other, as illustrated in FIG. 4, thereby preventing leakage of liquid crystal outwardly. In this case, in order to ensure that the start points and the end points of the seal patterns 416A–416F meet each other, the start points and the end points overlap with each other at certain portions.

Accordingly, in the case that the seal patterns 416A–416F are formed by the seal dispensing method such that their start points and end points overlap with each other at some portions, sealant is excessively distributed at the overlap portion compared to other portions.

The sealant excessively distributed at the portion where the start points and the end points of the seal patterns 416A–416F meet each other may spread internally and externally of the image display parts 413A–413F because of an attaching pressure in a follow-up process of attaching the substrates of the liquid crystal display panel.

Sealant that spreads into the image display parts 413A–413F contaminates liquid crystal, causing problems with picture quality of the liquid crystal display device and thus a yield of the liquid crystal display device is degraded.

In addition, sealant spread externally of the image display parts 413A–413F may infiltrate into a cut line at which a plurality of unit liquid crystal display panels fabricated on the large-scale mother substrate are cut, a follow-up process for cutting the plurality of liquid crystal display panels into individual unit liquid crystal display panels is interfered, and thus, productivity of the liquid crystal display device is degraded.

SUMMARY OF THE INVENTION

Accordingly, the present invention is directed to a seal pattern structure for liquid crystal display panel that substantially obviates one or more of the problems due to limitations and disadvantages of the related art.

Therefore, one advantage of the present invention is to provide a seal pattern structure for a liquid crystal display panel that minimizes an overlap portion of a seal pattern encompassing in a closed form an outer edge of an image display part.

To achieve these and other advantages and in accordance with the purpose of the present invention, as embodied and broadly described herein, there is provided a seal pattern structure for a liquid crystal display panel including a substrate having at least one image display part; a start pattern formed from a point spaced apart from the image display part to a point adjacent to an outer edge of the image display part; a main pattern connected to the start pattern and encompassing the outer edge of the image display part; and an end pattern connected to the main pattern and formed from the outer edge of the image display part to a point spaced apart from the image display part, wherein a connection part between the start pattern and the main pattern and a connection part between the main pattern and the end pattern cross each other.

In another aspect of the present invention, a method of forming a seal pattern on a substrate for a liquid crystal display panel includes providing a substrate having at least one image display part defined thereon; and providing a seal pattern surrounding the image display part, wherein the seal pattern has a start portion, a main portion and an end portion, the start portion and the end portion being outside the image display part and the main portion being between the start portion and the end portion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
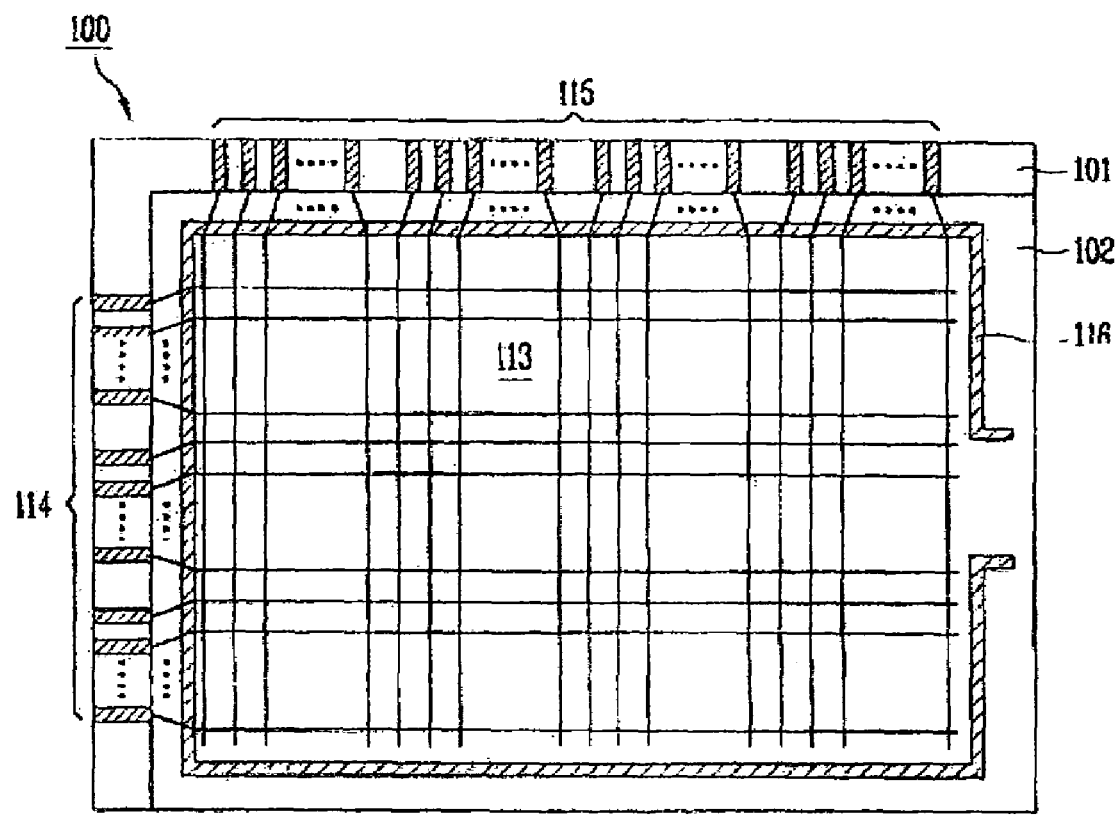
FIG. 1 is a plan view of the unit liquid crystal display panel formed by a thin film transistor array substrate and a color filter substrate according to the related art.
Figure 2A:
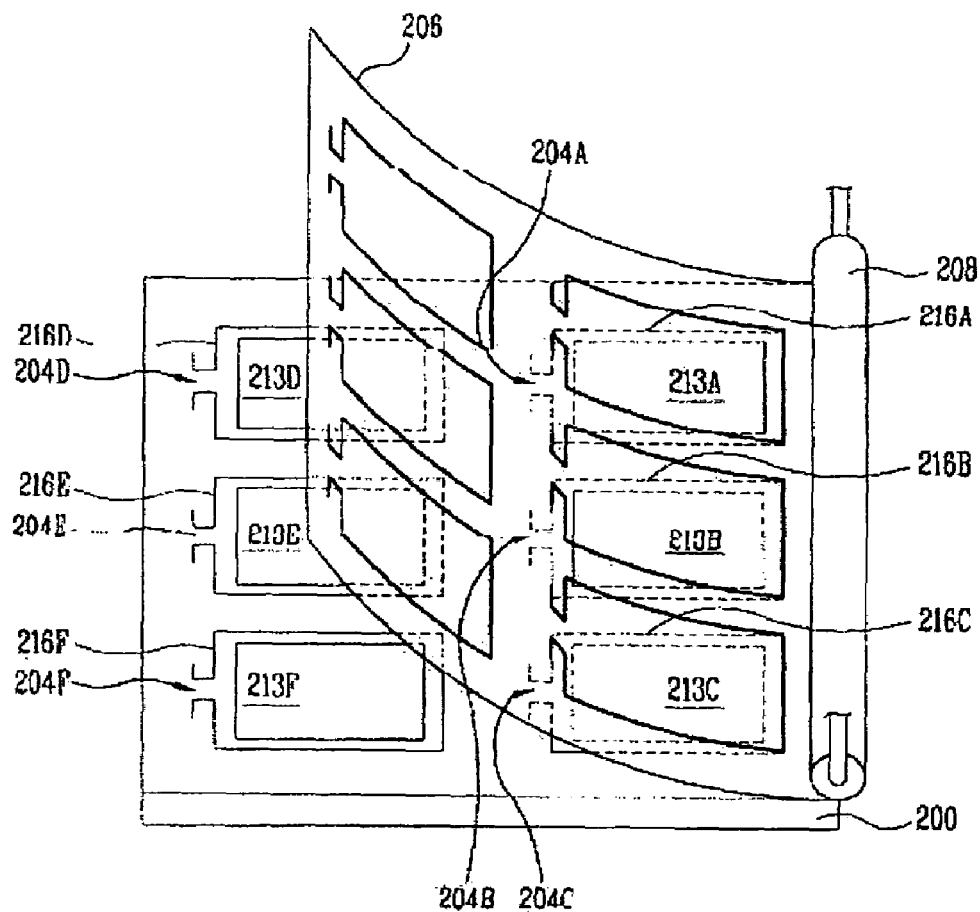
FIGS. 2A and 2B illustrate a screen printing method for forming seal patterns.
Figure 2B:
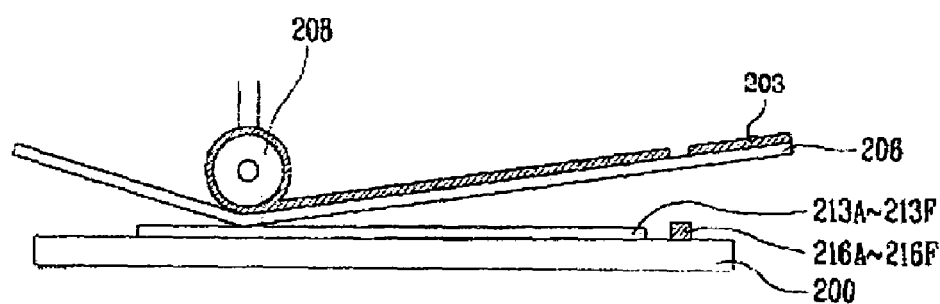
Figure 3:
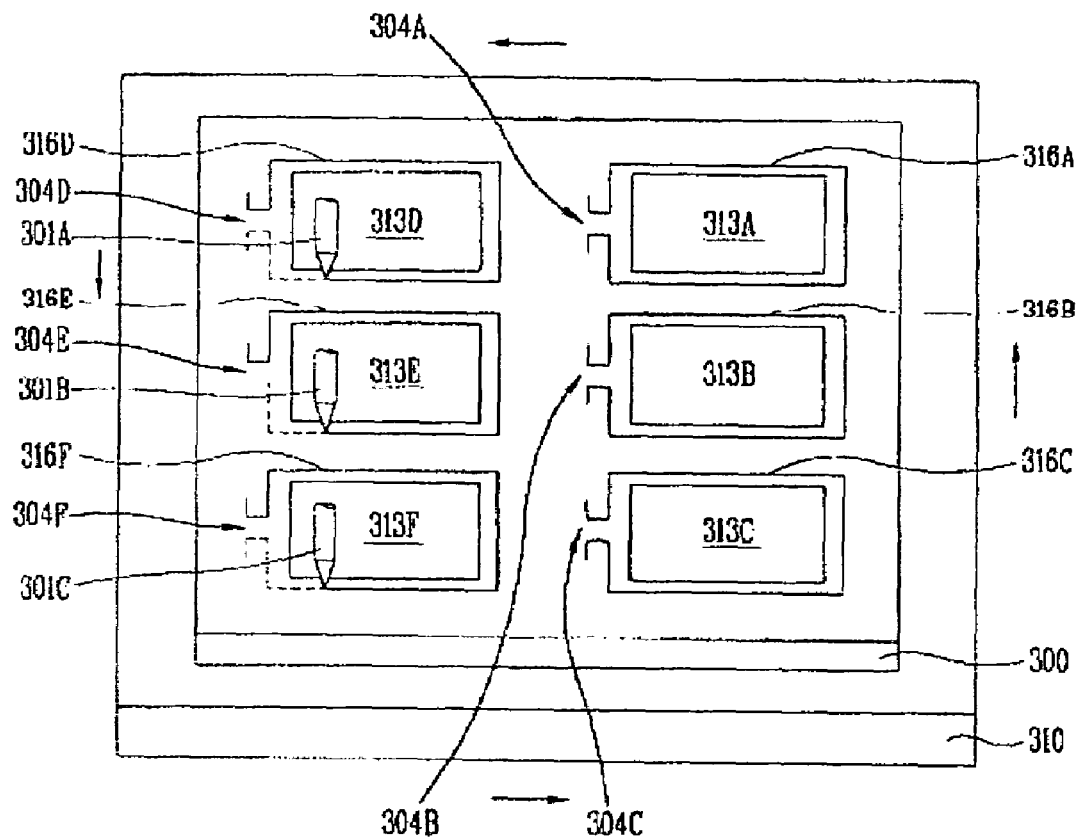
FIG. 3 illustrates a seal dispensing method for forming seal patterns.
Figure 4:
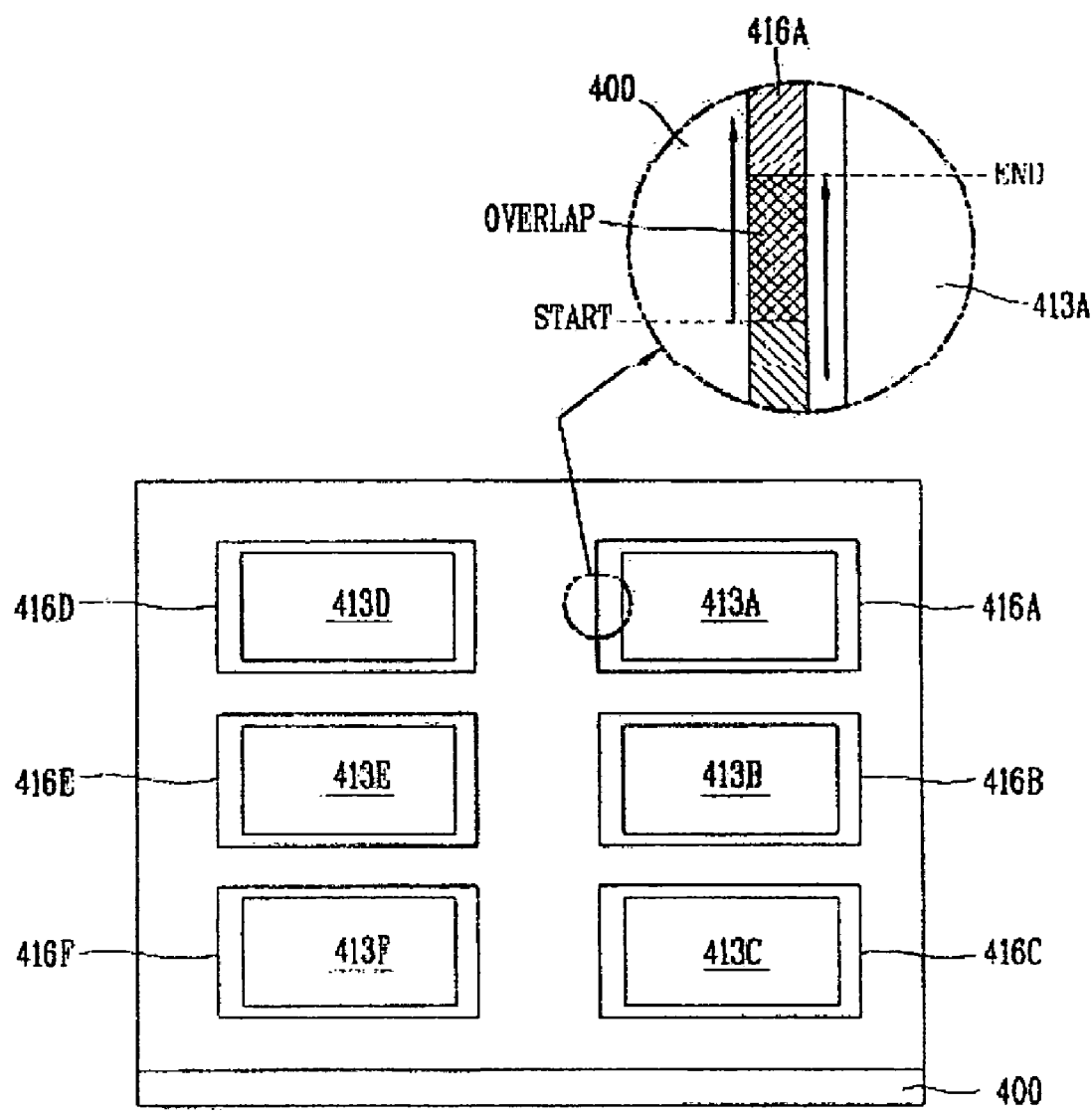
FIG. 4 is an exemplary view showing seal patterns formed in forming a liquid crystal layer on a liquid crystal display panel through a dropping method.
Figure 5:
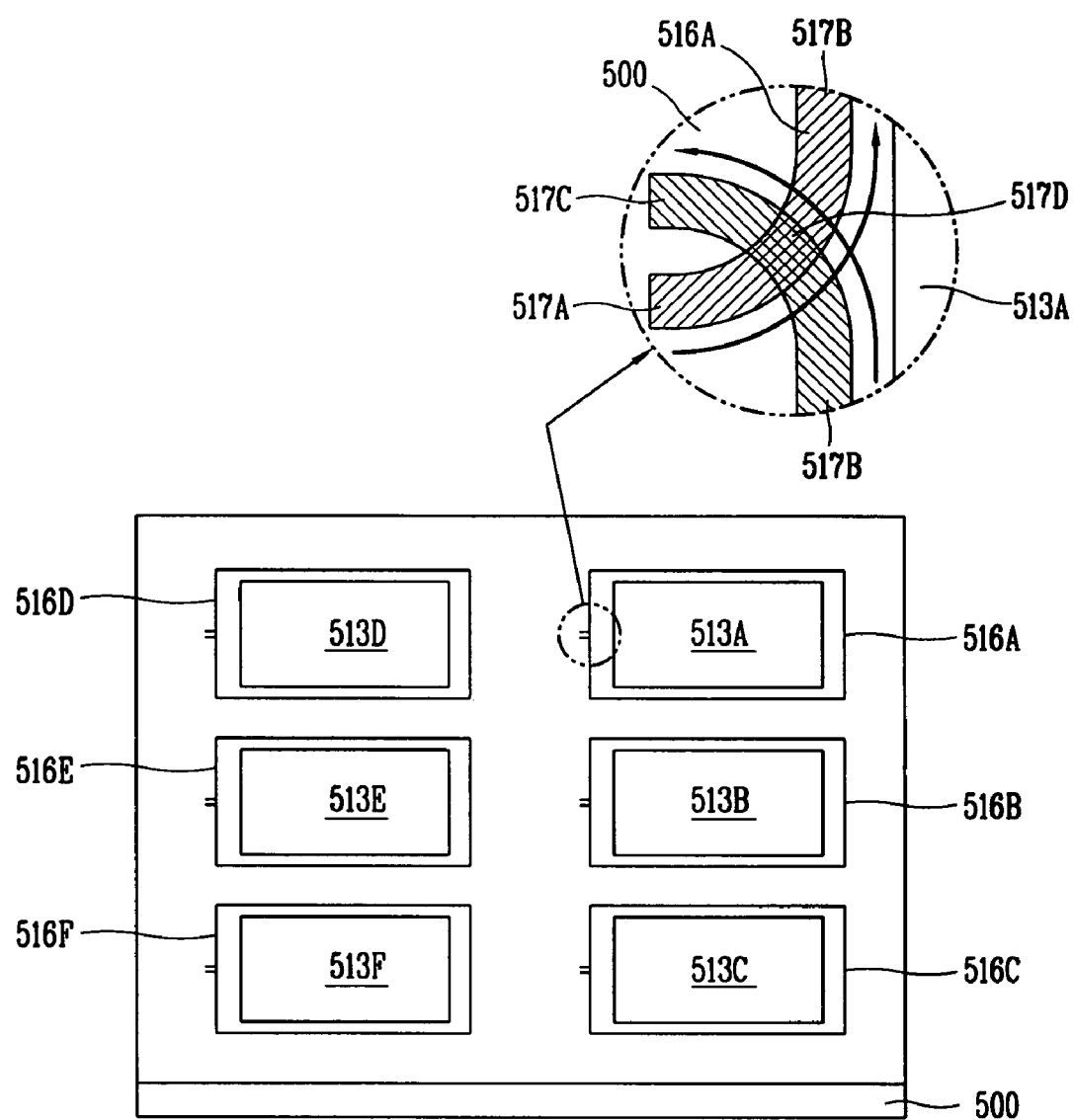
FIG. 5 is an exemplary view showing a seal pattern structure for a liquid crystal display panel in accordance with an embodiment of the present invention.

FIG. 5 is an exemplary view showing a seal pattern structure for a liquid crystal display panel in accordance with embodiment of the present invention.

With reference to FIG. 5, a plurality of image display parts 513A–513F and a plurality of seal patterns 516A–516F encompassing each outer edge of the image display parts 513A–513F are formed on a substrate 500. The substrate 500 may be a first large-scale mother substrate formed of glass on which a plurality of thin film transistor array substrates are formed, or a second large-scale mother substrate made of glass on which a plurality of color filter substrates are formed.

Liquid crystal is dropped or dispensed on the first mother substrate or on the second mother substrate. In this case, liquid crystal can be dropped on the first mother substrate or on the second mother substrate on which seal patterns 516A–516F have been formed, or may be dropped on the first mother substrate or on the second mother substrate on which seal patterns 516A–516F have not been formed.

After liquid crystal is dropped or dispensed on the first or second mother substrate, the first mother substrate and the second mother substrate are attached using the seal patterns 516A–516F, cut and processed to separate unit liquid crystal display panels.

Meanwhile, if the seal patterns 516A–516F are formed with thermosetting sealant, when the first mother substrate and the second mother substrate are vacuum-attached and thermally hardened, sealant may flow out to contaminate dropped liquid crystal. Thus, the seal patterns are preferably formed with a UV-hardening sealant or a mixture of the UV-hardening sealant and the thermosetting sealant.

As shown in an enlarged portion of FIG. 5, each of the seal patterns 516A–516F includes a substrate 500 on which an image display parts 513A is formed; a start pattern 517A formed from a point spaced apart from the image display part to a point adjacent to an outer edge of the image display part 513A; a main pattern 517B connected to the start pattern 517A and encompassing the outer edge of the image display part 513A; and an end pattern 517C connected to the main pattern 517B and formed from the outer edge of the image display part 513A to a point distanced from the image display part 513A. A connection part of the start pattern 517A and the main pattern 517B and a connection part 517D of the main pattern 517B and the end pattern 517C cross each other at a connection part 517D.

In order to minimize the crossing part between the connection part 517D of the start pattern 517A and the main pattern 517B and the connection part 517D of the main pattern 517B and the end pattern 517C, the start pattern 517A and the main pattern 517B and the main pattern 517B and the end pattern 517C may be connected in a round form,. e.g., the patterns may be substantially curved.

The start pattern 517A and the end pattern 517C may be formed to be substantially parallel to each other.

The start pattern 517A and the end pattern 517C may be formed to be gradually distanced from or to gradually come closer to the connection part 517D between the connection part of the start pattern 517A and the main pattern 517B and the connection part 517D of the main pattern 517B and the end pattern 517C.

The start pattern 517A and the end pattern 517C may be branched from the connection part 517D between the connection part of the start pattern 517A and the main pattern 517B and the connection part of the main pattern 517B and the end pattern 517C, and each end of the start pattern 517A and the end pattern 517C may correspond to each other (e.g., meet each other).

The start pattern 517A and the end pattern 517C may be formed anywhere in a dummy region of the substrate 500 where there is no image display part 513A.

Dummy seal patterns may be additionally formed at each outer edge region of the seal patterns 516A–516F in order to protect the seal patterns 516A–516F.

As mentioned above, in the seal pattern structure for a liquid crystal display panel, since the connection part of the start pattern 517A and the main pattern 517B and the connection part of the main pattern 517B and the end pattern 517C cross each other, the portion where the seal pattern ends overlap in the closed form seal pattern may be minimized.

Accordingly, sealant may not be excessively distributed at the crossing between the connection part of the start pattern and the main pattern and the connection part of the main pattern and the end pattern.

As so far described, the seal pattern structure for a liquid crystal display panel in accordance with the present invention has the following advantages.

That is, since the overlap portion of the seal pattern that encompasses in a closed form the outer edge of the image display part is minimized, excessive distribution of sealant at the seal pattern overlap portion can be prevented.

Accordingly, excessive distribution of sealant at the portion where the seal pattern overlaps resulting in spreading into the image display part because of an attaching pressure causing contamination of the liquid crystal may be prevented. Thus, deterioration of a picture quality of the liquid crystal display device may be prevented, and thus, a yield of the liquid crystal display device may be enhanced.

Also, the case in which sealant is excessively distributed at the portion where the seal pattern overlaps, spreads externally of the image display part because of an attaching pressure, and infiltrates into a cut line where a plurality of unit liquid crystal display panels fabricated on the first and second mother substrates are cut may be prevented. Thus, productivity of the liquid crystal display device may be enhanced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
    a first and a second substrates having at least one image display part;
    a start pattern on one of the first and second substrates formed from a point spaced apart from the image display part to a point adjacent to an outer edge of the image display part;
    a main pattern connected to the start pattern and encompassing the outer edge of the image display part; and
    an end pattern connected to the main pattern and formed from the outer edge of the image display part to a point spaced apart from the image display part;
    liquid crystal provided in the image display part;
    a cut line outside the start pattern, the main pattern and the end pattern;
    wherein a connection part between the start pattern and the main pattern and a connection part between the main pattern and the end pattern cross each other,
    wherein a size of the connection part is such that a sealant of the connection part does not come into contact with the cut line when the first and second substrates are attached together.

2. The liquid crystal display panel of claim 1, wherein one of the substrates is one of a first large-scale mother substrate having a plurality of thin film transistor array substrates and a second large-scale mother substrate having a plurality of color filter substrates.

3. The liquid crystal display panel of claim 1, wherein liquid crystal is supplied in the image display part.

4. The liquid crystal display panel of claim 1, wherein the liquid crystal is dispensed onto the substrate in the image display part.

5. The liquid crystal display panel of claim 1, wherein, the first substrate is attached to the second substrate.

6. The liquid crystal display panel of claim 5, wherein the liquid crystal is dispensed onto the second substrate.

7. The liquid crystal display panel of claim 1, wherein the start pattern, the main pattern and the end pattern are formed of UV-hardening sealant.

8. The liquid crystal display panel of claim 1, wherein the start pattern, the main pattern and the end pattern are formed of a mixture of UV-hardening sealant and thermosetting sealant.

9. The liquid crystal display panel of claim 1, wherein the start pattern, the main pattern and the end pattern are connected in a round form.

10. The liquid crystal display panel of claim 1, wherein the start pattern and the end pattern are formed to be substantially parallel to each other.

11. The liquid crystal display panel of claim 1, wherein the start pattern and the end pattern are formed to be substantially symmetric with each other.

12. The liquid crystal display panel of claim 1, wherein a distance between the start pattern and the end pattern gradually increases with the distance from the connection part.

13. The liquid crystal display panel of claim 12, wherein the distance between the start pattern and the end pattern gradually increases until the distance therebetween is a predetermined distance.

14. The liquid crystal display panel of claim 1, wherein the start pattern and the end pattern are branched from the crossing between the connection part of the start pattern and the main pattern and the connection part of the main pattern and the end pattern, and each end of the start pattern and the end pattern meet each other.

15. A method of manufacturing a liquid crystal display (LCD) device comprising:
preparing a first substrate and a second substrate;
providing a seal pattern with a sealant surrounding an image display part on one of the first and second substrates, wherein the seal pattern has a start portion, a main portion and an end portion, the start portion and the end portion being outside the image display part and the main portion being between the start portion and the end portion;
dispensing liquid crystal on one of the first and second substrates;
attaching the first and second substrates, wherein a connection portion between the start portion and the main portion and a connection portion between the main portion and the end portion cross each other, and wherein a size of the connection portion is such that a sealant of the connection portion does not come into contact with a cut line outside the seal pattern when the first and second substrates are attached together; and
cutting the attached first and second substrates along the cut line.

16. The method of claim 15, wherein providing a seal pattern comprising:
forming the start portion to be rounded to the exterior of the image display part;
forming the main portion contiguous with the start portion, the main portion forming a boundary of the image display part; and
forming the end portion contiguous with the main portion and rounded to the exterior of the image display part, the end portion overlapping the start portion.

17. The method of claim 15, wherein the start portion and the end portion are formed to be substantially parallel to each other.

18. The method of claim 15, wherein the start portion and the end portion are formed to be substantially symmetric with each other.

19. The method of claim 15, wherein a distance between the start portion and the end portion gradually increases with the distance from the connection part.

20. The method of claim 19, wherein the distance between the start portion and the end portion gradually increases until the distance therebetween is a predetermined distance.

21. A method of manufacturing a liquid crystal display device comprising:
providing a first substrate;
providing a second substrate;
dispensing a liquid crystal on either the first or second substrate;
forming a seal pattern with a sealant on either the first or second substrate, wherein the a seal pattern surrounds an image display part on one of the first and second substrates, and wherein the seal pattern has a start portion, a main portion and an end portion, the start portion and the end portion being outside the image display part and the main portion being between the start portion and the end portion;
bonding the first and second substrates, wherein a connection portion between the start portion and the main portion and a connection portion between the main portion and the end portion cross each other, and wherein a size of the connection part is such that a sealant of the connection part does not come into contact with a cut line outside the seal pattern when the first and second substrates are bonded together;
curing the sealant; and
cutting the attached first and second substrates along the cut line.

* * * * *